US008296452B2

(12) United States Patent
Rose et al.

(10) Patent No.: US 8,296,452 B2
(45) Date of Patent: *Oct. 23, 2012

(54) APPARATUS AND METHOD FOR DETECTING TINY FRAGMENT ATTACKS

(75) Inventors: Kenneth M. Rose, Palo Alto, CA (US); Venkateshwar R. Pullela, San Jose, CA (US); David S. Walker, San Jose, CA (US); Kevin C. Wong, Santa Clara, CA (US); Kaichuan He, San Jose, CA (US); Yu Kwong Ng, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1033 days.

This patent is subject to a terminal disclaimer.

(21) Appl. No.: 10/383,128

(22) Filed: Mar. 6, 2003

(65) Prior Publication Data

US 2004/0205228 A1    Oct. 14, 2004

(51) Int. Cl.
*G06F 15/16* (2006.01)
(52) U.S. Cl. ...................................... 709/230
(58) Field of Classification Search .................. 709/200, 709/225, 224, 230
See application file for complete search history.

(56) References Cited

U.S. PATENT DOCUMENTS

| | | | | |
|---|---|---|---|---|
| 4,271,507 A * | 6/1981 | Gable et al. | ................ | 370/432 |
| 5,307,345 A * | 4/1994 | Lozowick et al. | ............ | 370/428 |
| 5,850,388 A * | 12/1998 | Anderson et al. | ............ | 370/252 |
| 6,044,081 A * | 3/2000 | Bell et al. | ................ | 370/401 |
| 6,052,375 A * | 4/2000 | Bass et al. | ................ | 370/412 |
| 6,105,079 A * | 8/2000 | Kuo et al. | ................ | 710/25 |
| 6,122,670 A * | 9/2000 | Bennett et al. | ................ | 709/236 |
| 6,247,060 B1 | 6/2001 | Boucher et al. | ................ | 709/238 |
| 6,347,087 B1 * | 2/2002 | Ganesh et al. | ................ | 370/392 |
| 6,480,489 B1 | 11/2002 | Muller et al. | ................ | 370/389 |
| 6,625,764 B1 | 9/2003 | Dawson | ................ | 714/715 |
| 6,643,710 B1 | 11/2003 | Thorne | ................ | 709/250 |
| 6,714,985 B1 | 3/2004 | Malagrino et al. | ............ | 709/236 |
| 7,031,267 B2 * | 4/2006 | Krumel | ................ | 370/255 |
| 7,269,186 B2 * | 9/2007 | Abrol et al. | ................ | 370/476 |
| 2001/0007560 A1 * | 7/2001 | Masuda et al. | ................ | 370/401 |
| 2001/0050923 A1 | 12/2001 | Park et al. | ................ | 370/474 |
| 2003/0005144 A1 * | 1/2003 | Engel et al. | ................ | 709/235 |
| 2003/0031172 A1 | 2/2003 | Grinfeld | ................ | 370/389 |
| 2003/0058889 A1 | 3/2003 | Lansing et al. | ................ | 270/471 |

(Continued)

OTHER PUBLICATIONS

Miller, I., et al., "Protection Against a Variant of the Tiny Fragment Attack," Request for Comments: 3128, Singularis Ltd., Jun. 2001, pp. 1-5.

(Continued)

*Primary Examiner* — Jason Recek
(74) *Attorney, Agent, or Firm* — Campbell Stephenson LLP

(57) ABSTRACT

Disclosed is a method and apparatus for checking link layer protocol frames such as Ethernet frames. The method can be implemented on a processor executing software instructions stored in memory. In one embodiment of the invention, the method includes receiving an Ethernet frame, and counting data bytes of the Ethernet frame to generate a total number of counted bytes. The total number of counted bytes can be used to calculate a data length of a datagram of the Ethernet frame. Once calculated, the datagram data length can be compared to a predetermined value. If the datagram length does not fall within an acceptable range of the predetermined value, the Ethernet frame may be dropped so that the Ethernet frame does not reach its final destination.

28 Claims, 7 Drawing Sheets

U.S. PATENT DOCUMENTS

| | | | |
|---|---|---|---|
| 2003/0172177 A1 | 9/2003 | Kersley et al. | 709/236 |
| 2003/0233567 A1* | 12/2003 | Lynn et al. | 713/200 |
| 2004/0093513 A1* | 5/2004 | Cantrell et al. | 713/201 |
| 2004/0156371 A1 | 8/2004 | Kumar | 370/401 |

OTHER PUBLICATIONS

Ziemba, G., et al., "Security Considerations for IP Fragment Filtering," Request for Comments: 1858, Cisco Systems, Oct. 1995, XP-002249090, pp. 1-10.

Patent Cooperation Treaty from the International Searching Authority; "Notification of Transmittal of the International Search Report and the Written Opinion of the International Searching Authority, or the Declaration;" date of mailing Jul. 30, 2004; International Application No. PCT/US2004/005958; 3 pages.

Patent Cooperation Treaty from the International Searching Authority; "Written Opinion of the International Searching Authority;" date of mailing Jul. 30, 2004; International Application No. PCT/US2004/005958: 10 pages.

Patent Cooperation Treaty from the International Searching Authority; "International Search Report," date of mailing Jul. 30, 2004; International Application No. PCT/US2004/005958; 4 pages.

Kenneth M. Rose, Venkateshwar R. Pullela, David S. Walker, Kevin C. Wong, Kaichuan He and Yu Kwong Ng., pending U.S. pending U.S. Patent Application entitled "Apparatus and Method for Filtering IP Packets," U.S. Appl. No. 10/407,006, filed Apr. 4, 2003, including Specification: pp. 1-18; Drawings: Figures 1-14 on 7 sheets.

RFC 1858, available on web at http://www.faqs.org/rfcs/rfc1858.html, Oct. 1995.

RFC 793, available on web at http://www.faqs.org/rfcs/rfc793.html, Sep. 1981.

Information Sciences Institute, University of Southern California; DARPA Internet Program, Protocol Specification, Transmission Control Protocol; Request for Comments: 793; Sep. 1981; pp. 1-85; (http://www.ibiblio.org/pub/docs/rfc/rfc793.txt).

Ziemba, G. of Atlantec, D. Reed of Cybersource, and P. Traina of Cisco Systems, "Security Considerations for IP Fragment Filtering," Network Working Group, Request for Comments: 1858; Category: Informational; Oct. 1995; pp. 1-10.

* cited by examiner

APPARATUS AND METHOD FOR DETECTING TINY FRAGMENT ATTACKS

BACKGROUND OF THE INVENTION

The Transmission Control Protocol/Internet Protocol (TCP/IP) protocol suite allows computers of all sizes, from many different computer vendors, running totally different operating systems, to communicate with each other. Stevens, W. Richard, 1994, TCP/IP Illustrated, Volume 1, which is incorporated herein by reference, describes general aspects of the TCP/IP protocol suite. Request For Comment (RFC) 793, also incorporated by reference, is considered the main TCP specification. Additional RFCs that describe TCP and IP are published for informational purposes. The RFCs are provided by the Internet Engineering Task Force (IETF) at www.ietf.org.

FIG. 1 is a block diagram illustrating a networked system consisting of a pair of computer systems (nodes) 12 and 14 executing the TCP/IP protocol suite. In FIG. 1, nodes 12 and 14 communicate with each other by transmitting frames of data via router 16 and Ethernet communication links 20 and 22.

FIG. 2 is a block diagram illustrating relevant components the TCP/IP protocol suite. More particularly, nodes 12 and 14 are shown having four communication layers 30-36 and 40-46, respectively. Layers 30-36 and 40-46 take form in software executing on one or more processors in nodes 12 and 14, respectively. Layers 32-36 and 42-46 are implemented in operating systems of nodes 12 and 14, respectively, while layers 30 and 40 take form in any one of many user applications including File Transfer Protocol (FTP), Simple Mail Transfer Protocol (SMTP), telnet for remote login, etc.

Layers 32 and 42 of nodes 12 and 14, respectively, are commonly referred to as the transport layers. There are several distinct transport layers including TCP and User Datagram Protocol (UDP). For purposes of explanation, layers 32 and 42 will take form in either the TCP or UDP transport layers. Layers 34 and 44 are commonly referred to as the network layers. A network layer may take many forms such as Internet Control Message Protocol (ICMP) or IP. For purposes of explanation, FIG. 2 will be described with layers 34 and 44 taking form in the well-known IP network layer. Lastly, layers 36 and 46 are commonly referred to as the link or network interface layers. This layer handles the details of physically interfacing with a communication link. For purposes of explanation, link layers 36 and 46 will take form in Ethernet link layers for interfacing with Ethernet communication links 20 and 22, respectively.

Most networked systems are designed such that at least one node is a client to a server node. In FIG. 2, node 12 is presented as a client to server node 14. In this configuration, server application 40 provides some type of service (e.g., SMTP) in response to a request from client application 30. When client application 30 communicates with server application 40, including a request for service, client application 30 sends data down through layers 32-36 until the data is sent as a stream of bits to node 14 via router 16 and communication links 20 and 22. The data received by node 14 is sent up through layers 46-42 until it reaches server application 40.

As data moves down layers 30-36 of node 12, each of the layers 30-36 adds headers (and sometimes trailers) containing communication information. FIG. 3 illustrates relevant aspects of this process. FIG. 3 shows data 50 generated by application layer 30. An application header 52 is concatenated to data 50 by application layer 30, the result of which is provided to TCP/UDP layer 32 as application data 54. TCP/UDP layer 32, in turn, concatenates a TCP or UDP header to application data 54 received from application layer 30. For purposes of explanation, TCP/UDP layer 32 concatenates a TCP header 56 to application data 54, the result of which is provided to IP layer 34. The unit of data that the TCP layer 32 sends to IP layer 34 is called an IP payload. IP layer 34 concatenates an IP header 60 to the IP payload it receives, the result of which is provided to Ethernet link 36. Generally, the unit of data that layer 34 sends to layer 36 is referred to as an IP datagram (datagram) or packet. As will be more fully described below, a datagram can be fragmented and sent to Ethernet layer 36 as datagram fragments. Ethernet layer 36 appends an Ethernet header 62 and Ethernet trailer 64 to the datagram or datagram fragments received from IP layer 34, the result of which is referred to as an Ethernet frame.

The Ethernet frame is transmitted to node 14 as a stream of bits via router 16 and Ethernet communication links 20 and 22 (FIG. 2). When the Ethernet frame is received at destination node 14, the frame moves up through the protocol layers 46-42, and all headers (and trailers) are removed by the appropriate protocol layer until the original data 50 is provided to server application 40. Each layer looks at certain identifiers in its corresponding header to determine which succeeding layer is to receive the data. This is called demultiplexing. For example, Ethernet layer 46 routes the datagram or datagram fragment of the frame it receives to IP layer 44 after Ethernet layer 46 strips off the Ethernet header and trailer 62 and 66, respectively.

FIG. 4 shows an exemplary Ethernet frame in greater detail. The Ethernet frame includes header 62, datagram 64, and trailer 66. The header 62 consists of a 6-byte Ethernet destination address, a 6-byte Ethernet source address, and a 2-byte type code. The Ethernet trailer 66 consists of a Cyclic Redundancy Check (CRC) field. CRC field is used to detect errors in the rest of the frame. Figures in this specification, including FIG. 4, show an empty 2-byte field in the Ethernet frame header adjacent the 2-byte type code. This empty field contains no data. This empty field is simply provided in the Figures so that datagram 64 can be positioned to begin at the first bit of the first line after the header.

FIG. 5 illustrates an exemplary IP datagram having an IP header 80 and IP payload (e.g., TCP segment) 82. The IP header shown in FIG. 5 includes many fields each of which stores a value. The 4-bit header length field defines the number of 32-bit words in the IP header, including any option fields. The 16-bit total length field defines the total length of the IP datagram in bytes. The header length subtracted from the total length can be used to determine the IP payload (e.g., TCP segment) length. The 8-bit protocol field defines the transport layer (e.g., TCP or UDP) that is to receive the IP payload of the datagram.

Normally, an upper limit is imposed on the size of the frame that can be transmitted between nodes 12 and 14. Many IP datagrams are fragmented to meet this limit. Thus, an IP datagram may be fragmented into IP datagram fragments, each of which is provided to the Ethernet layer for transmission in a separate frame. When an IP datagram is fragmented it is not reassembled until it reaches its final destination. The IP layer at the destination performs the reassembly. The 16-bit identification field shown in FIG. 5 contains a unique value for each IP datagram that the sender transmits. This number is copied into each fragment of a particular datagram. The 13-bit fragment offset field of the header shown in FIG. 5, contains the offset (in 8 byte units), of the fragment from the beginning of the original IP datagram. When an IP datagram is fragmented, the total length field of each fragment is changed to be the size of that fragment.

FIGS. 6 and 7 illustrate UDP and TCP segments, respectively. In FIG. 7, the TCP segment (IP payload) includes a TCP header 90 and application data. TCP header 90 includes several fields each containing a value. The 4-bit header length defines the length of the TCP header in 32-bit words. When a new connection is sought to be established between nodes 12 and 14 for the purposes of, for example, file transfer, the 1-bit SYN flag of the TCP header 90 is turned on or set to binary 1. TCP headers as well UDP headers include 16-bit port number fields. Servers, such as node 14, are normally known by their well-known port number. For example, every TCP/IP implementation that provides an FTP server provides that service on TCP port number 21. Telnet servers are commonly on TCP port number 23.

Unauthorized access (i.e., hacking) of computer systems, such as node 14 of FIG. 2, continues to be an ongoing problem. Filters are often provided in routers, such as router 16, for preventing unauthorized access of computer systems. Filters, oftentimes referred to as firewalls, may take form in hardware and/or software executing on one or more processors. FIG. 2 shows router 16 having a filter 100. Filter 100 checks frames (or the IP datagrams thereof) received by router 16 to ensure that the frames are not designed to initiate an unauthorized operation at node 14. If a frame is deemed by filter 100 to be part of an authorized operation, the frame is allowed to pass through the filter. If the frame is deemed by the filter to be part of an unauthorized operation, the frame is dropped by filter 100 so that the frame cannot reach its final destination (i.e., node 14).

Filter 100 performs numerous checks on frames it receives. For example, filter 100 compares the destination port number and SYN flag values of all frames it receives. If the destination port number and SYN flag values of a received frame equal 21 and binary 1, respectively, the received frame is configured to initiate an unauthorized file transfer protocol (FTP) and will be dropped by filter 100. FIG. 8 shows a frame 102 having a TCP header 90 with a destination port number and a SYN flag set to 21 and binary 1, respectively. Frame 102 is configured to initiate a file transfer at node 14. Filter 100 will drop frame 102.

As noted above, IP datagrams can be fragmented to meet the limit on the size of frames that can be transmitted between nodes 12 and 14. Fragmented IP datagrams are not reassembled until they reach their final destination, e.g., node 14. Thus, Ethernet frames containing datagram fragments can pass through router 16, and filter 100 thereof, before reaching destination node 14. Fragmentation can be used to disguise frames from filter 100. One technique for disguising frames using fragmentation is often referred to as a "tiny fragment attack." For example, FIGS. 9 and 10 illustrate frames containing datagram fragments which, when reassembled at node 14, can initiate an otherwise unauthorized file transfer operation. More particularly, FIG. 9 shows a frame 104 consisting of an Ethernet header 62, datagram fragment 64, and CRC 66. Datagram fragment 64 of frame 104 includes full IP and TCP headers. Frame 106 shown in FIG. 10 also includes an Ethernet header 62, datagram fragment 64 and CRC 66. Datagram fragment 64 includes an IP header 80 with fragment offset set to 0 and a less than full TCP header 90. As such, datagram fragment 64 of frame 106 is referred to as a tiny fragment. As will be more fully described below, filter 100 will pass frames 104 and 106 to node 14. FIG. 11 shows the datagram payload which results when node 14 reassembles the payloads of the datagram fragments of frames 104 and 106. The datagram payload of FIG. 11 initiates an otherwise unauthorized FTP at node 14.

Frames 104 and 106 shown in FIGS. 9 and 10, respectively, are transmitted to router 16 in sequence. As noted above, one of the checks performed by filter 100 is to compare the destination port number and SYN flag values to 21 and binary 1, respectively, of received frames. In frame 104 of FIG. 9, the destination port number in TCP header 90 is set to 23 while the SYN flag is set to binary 1. With these destination port number and SYN flag values, frame 104 passes the filter check mentioned above, and frame 104 is forwarded to node 14. Frame 106 shown in FIG. 10 includes only a source port number, a destination port number, and a sequence number. Filter 100 will pass frame 106 since frame 106 lacks a destination port number equal to 21 and SYN flag equal to binary 1. It is noted that the fragment offset is set to 0 within frame 106. As such, when the datagram payload fragments contained in frames 104 and 106 are reassembled at node 14, the source port number, destination port number, and sequence number of the TCP header 90 in FIG. 9 will be overwritten with the source port number, destination port number, and sequence number, respectively, of the TCP header 90 shown in FIG. 10, resulting in the datagram shown in FIG. 11.

The tiny fragment attack described above can be averted. More particularly, RFC 3128 describes an algorithm which may be used within filter 100 to avert the tiny fragment attack described above. The RFC 3128 algorithm provides:

--- if (Protocol = TCP)
    if   (Fragment Offset = 0)
        Check Length 1 $\geq$ 16 bytes
    else
        Check Fragment Offset $\geq$ 2,

--- where Length 1 is calculated by filter 100 for each frame according to the following equation:

---

Length 1 (in bytes) =   (Total Length Value in IP Header of the Received Frame) − ((IP Header Length Value in IP Header of the Received Frame) × 4).

---

In accordance with the RFC 3128 algorithm above, filter 100 will drop any frame it receives if the protocol field of the IP header is set to TCP, the fragment offset of the IP header is set to 0, and the calculated Length 1 is less than 16 bytes. Additionally, filter 100 will drop any received frame if the fragment offset of the IP header is set to 1. Frame 104 shown in FIG. 9 will pass both checks performed by filter 100 executing the RFC 3128 algorithm above. However, frame 106 shown in FIG. 10 will be dropped by filter 100 since the calculated Length 1 of frame 106 is 8 bytes.

The RFC 3128 algorithm set forth above is incapable of averting certain variations of the tiny fragment attack described above. To illustrate, FIG. 12 shows a frame 108 having an Ethernet header 62, a datagram 64, and CRC 66. As can be seen in FIG. 12, TCP header 90 of frame 108, like TCP header 90 shown in FIG. 10, is less than a complete or full TCP header. Note also that the value of the total length field of the IP header is 36 bytes in frame 108 even though actual total length of the datagram 64 is 28 bytes. Frame 108 may pass RFC 3128 algorithm above since the calculated Length 1 is 16 bytes. Unfortunately, if the frame 108 passes filter 100 and datagram 64 of frame 108 combines with random data in memory of node 14, the result may produce an unauthorized operation such as file transfer protocol.

SUMMARY OF THE INVENTION

Disclosed is a method and apparatus for checking Ethernet frames. The method can be implemented on a processor executing software instructions stored in memory. In one embodiment of the invention, the method includes receiving an Ethernet frame, and counting data bytes of the Ethernet frame to generate a total number of counted bytes. The total number of counted bytes can be used to calculate a data length of a datagram of the Ethernet frame. Once calculated, the datagram data length can be compared to a predetermined value. If the datagram length exceeds the predetermined value, the Ethernet frame may be dropped so that the Ethernet frame does not reach its final destination

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 13:
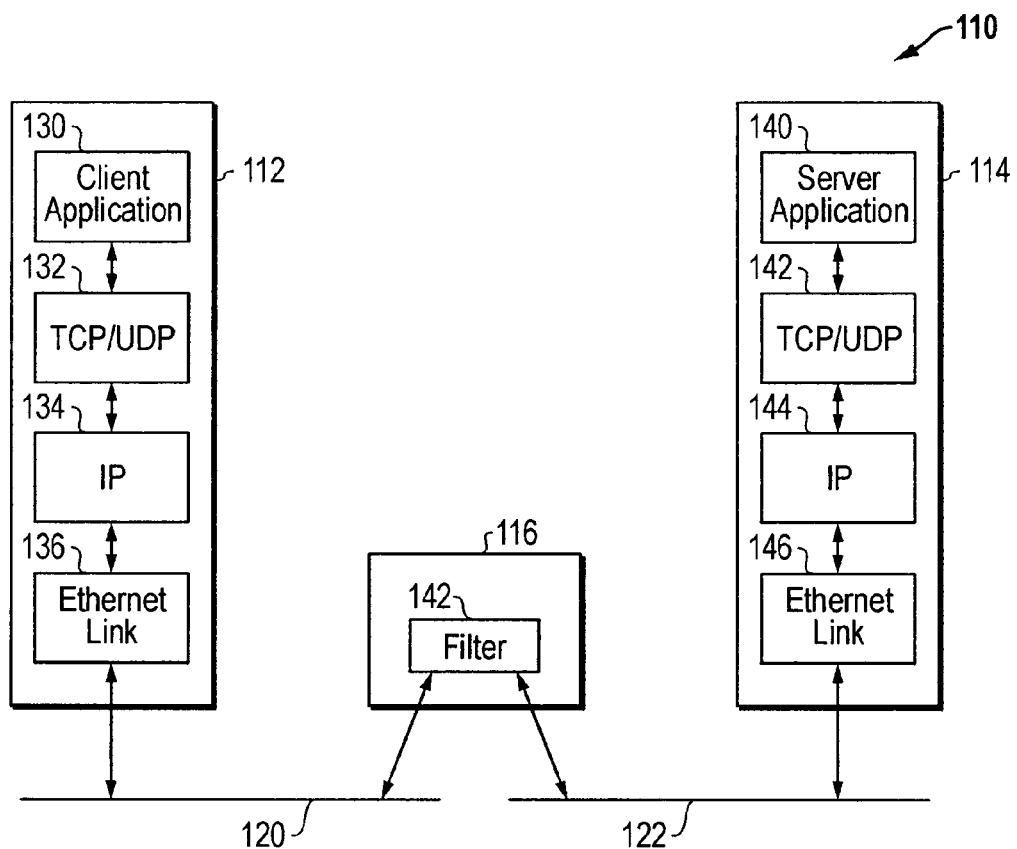
FIG. 13 is a block diagram illustrating relevant components of a networked system employing one embodiment of the present invention.

FIG. 13 is a block diagram illustrating relevant components of a networked system 110 employing one embodiment of the present invention. FIG. 13 shows a pair of computer systems (nodes) 112 and 114 executing the TCP/IP protocol suite. In FIG. 13, nodes 112 and 114 are coupled to each other via a router or switch 116 and Ethernet communication links 120 and 122. In one embodiment, the present invention may take form in software executing on one or more processors within router or switch 116. In another embodiment, the present invention may take form in an application specific integrated circuit (ASIC) in router or switch 116. The present invention should not be limited to use within router or switch 116. The present invention could find use within, for example, node 114. For purposes of explanation, the present invention will be explained as being used within router 116, it being understood that the present invention should not be limited thereto.

Nodes 112 and 114 are shown having four communication layers 130-136 and 140-146, respectively. Layers 130-136 and 140-146 take form in software instructions executing on one or more processors in nodes 112 and 114, respectively. Layers 132-136 and 142-146 are implemented in operating systems of nodes 12 and 14, respectively. Layers 130 and 140 and nodes 112 and 114, respectively, take form in any one of many user applications including FTP, SMTP, telnet, etc.

For purposes of explanation, layers 132 and 142 will take form in either TCP or UDP transport layers, layers 134 and 144 will take form in IP network layers, while layers 136 and 146 take form in Ethernet link layers for interfacing with Ethernet communication links 120 and 122, respectively. In FIG. 13, node 112 is presented as a client to server node 114. Server application 40 provides some type of service (e.g., SMTP) to client application 130 in response to a request from client application 130. Client application 130 communicates with server application 140 by sending data down through layers 132-136 until the data, along with appended headers and/or trailers, is sent as a stream of bits to node 114 via router 116 and communication links 120 and 122. The data received by node 114 is sent up through layers 146-142 until the data, less headers and/or trailers reaches server application 140. The type of headers and/or trailers generally added to data generated by layers 130-136 are described in the background section above with reference to FIGS. 4-7.

Router 116 shown in FIG. 13 includes a filter 142 that checks frames it receives. If a frame received by router 116 passes the checks performed by filter 142, the frame is passed to, for example, node 114. If a frame received by router 116 does not pass one or more of the checks performed by filter 142, the frame is dropped so that the frame does not reach its destination (e.g., node 114). Filter 142 can perform many checks on frames received by router 116. In one embodiment, filter 142 performs any one or more of the checks of the algorithm listed below:

```
if (Protocol = TCP)
    if    (Fragment Offset = 0)
          Check Length 1 ≧ (P0 × 8)       Check (1)
          Check Length 2 ≧ (P0 × 8)       Check (2)
          Check TCP Header Length ≧ 5     Check (3)
    else
          Check Fragment Offset ≧ P0       Check (4)
if (Protocol = UDP)
    if    (Fragment Offset = 0)
          Check Length 1 ≧ (P1 × 8)       Check (5)
          Check Length 2 ≧ (P1 × 8)       Check (6)
    else
          Check Fragment Offset ≧ P1       Check (7)
else
    if    (Fragment Offset = 0)
          Check Length 1 ≧ (P2 × 8)       Check (8)
          Check Length 2 ≧ (P2 × 8)       Check (9)
    else
          check Fragment Offset ≧ P2,      Check (10)
```
where Length 1 and Length 2 are calculated according to the following equations:

Length 1 (in bytes) = (Total Length Value in IP Header of the Received Frame) − ((IP Header Length Value in IP Header of the Received Frame) × 4).

| Length 2 (in bytes) = | (Total Number of Counted Bytes in the Received Frame) − (Total Number of Data Bytes In Ethernet Header and Trailer of the Received Frame) − ((IP Header Length Value in IP Header of the Received Frame) × 4) |
|---|---|

P0, P1, and P2 in the above algorithm are programmable values stored within memory. P0, P1, and P2 may be equal to each other, or different from each other. It is noted that P0, P1, and P2 are multiplied by 8 in the above algorithms. In an alternative embodiment, P0, P1, and P2 may be multiplied by values other than 8.

Length 2 is calculated as a function of the total number of counted bytes in the received frame to be checked. The total number of counted bytes of the received frame can be generated in one of many different ways. In one embodiment, a counting variable N in memory is initially to 0. Thereafter, N is incremented by one for each byte in the received frame until all bytes in the received frame are counted. The bytes of the frame can be counted as the bytes enter the router 116, or the bytes can be counted after the received frame has been temporarily stored in memory of router 116.

In an alternative embodiment, Length 2 can be calculated as follows:

Length 2 (in bytes)=(Total Number of Counted Bytes in the Datagram of the Received Frame)−((IP Header Length Value in IP Header in the Received Frame)×4)

It is noted that in this alternative embodiment of calculating Length 2, only the bytes of the datagram of the received frame need be counted. The total number of counted bytes of the datagram can be generated in one of many different ways. In one embodiment, a counting variable M in memory is initially to 0. Thereafter, M is incremented by one for each byte of the datagram in the received frame until all bytes of the datagram are counted. The bytes of the datagram can be counted as the bytes of the datagram enter the router 116, or the bytes of the datagram can be counted after the datagram have been temporarily stored in memory of router 116.

In operation, filter 142 will drop any received frame if any one or more of the various checks (1)-(10) are not passed. It is noted that filter 142 need not perform all checks (1)-(10) listed above for each frame received by router 116. For example, filter 142 at one point in time, may perform only check (2) or only check (3), or filter 142 may perform only checks (2), (3) and (4) on frames received by router 116. At another point in time, filter 142 may perform all checks (1)-(10) on frames received by router 116. For purposes of explanation, it will be presumed that filter 142 performs all checks (1)-(10) on all frames received by router 116.

Thus, if router 116 receives a frame, regardless of whether its datagram contains a UDP or TCP segment as identified in the protocol field of the IP header, if the fragment offset of the IP header is set to 0, and if Lengths 1 or 2 are calculated to be less than P2×8, filter 142 will drop the frame such that it never reaches its destination (e.g., node 14) in accordance with checks (8) and (9), respectively. If router 116 receives a frame, regardless of whether its datagram contains a UDP or TCP segment as identified in the protocol field of the IP header, filter 142 will drop the frame if the fragment offset defined in the IP header is not equal to 0 but is less than P2 in accordance with check (10).

If router 116 receives a frame having a UDP segment in its datagram (as identified in the protocol field of the IP header of the received frame) and if the fragment offset set forth in the IP header of the received frame is set to 0, then filter 142 will drop the received frame if Length 1 or Length 2 is less than P1×8 in accordance with checks (5) and (6), respectively. If router 116 receives a frame having a UDP segment, filter 142 will drop the frame if the fragment offset set forth in the IP header is not set to 0 but is set to a value less than P1 in accordance with check (7).

If router 116 receives a frame having a TCP segment in its datagram (as identified in the protocol field of the IP header of the received frame), filter 142 will drop the frame if the fragment offset value set forth in the IP header is set to 0, and if Length 1 or Length 2 is less than P0×8 in accordance with checks (1) and (2), respectively. If router 116 receives a frame having a TCP segment in its datagram (as identified in the protocol field of the IP header of the received frame), filter 142 will drop the frame if the value of the TCP header length field is than 5 in accordance with check (3). If router 116 receives a frame having a TCP segment, filter 142 will drop the frame if the fragment offset set forth in the IP header is not set to 0 but is set to a value less than P0 in accordance with check (4).

Figure 1:
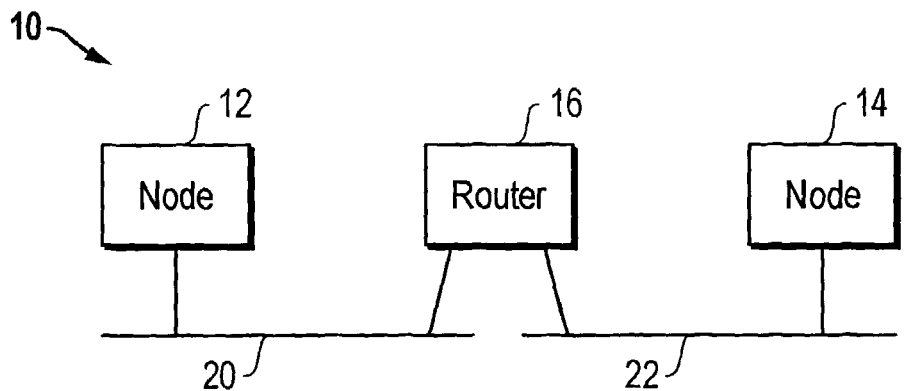
FIG. 1 is a block diagram illustrating relevant components of a networked system.
Figure 2:
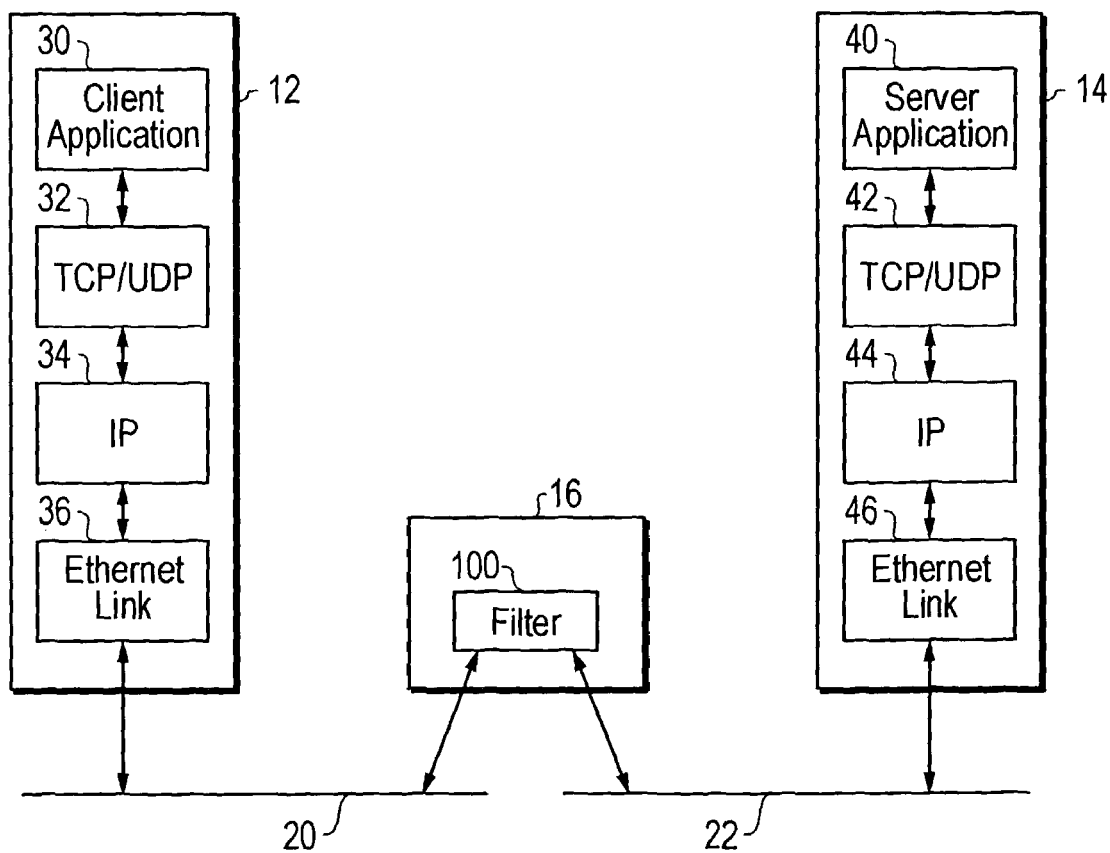
FIG. 2 is a block diagram illustrating relevant components of the nodes of the networked system shown in FIG. 1.
Figure 3:
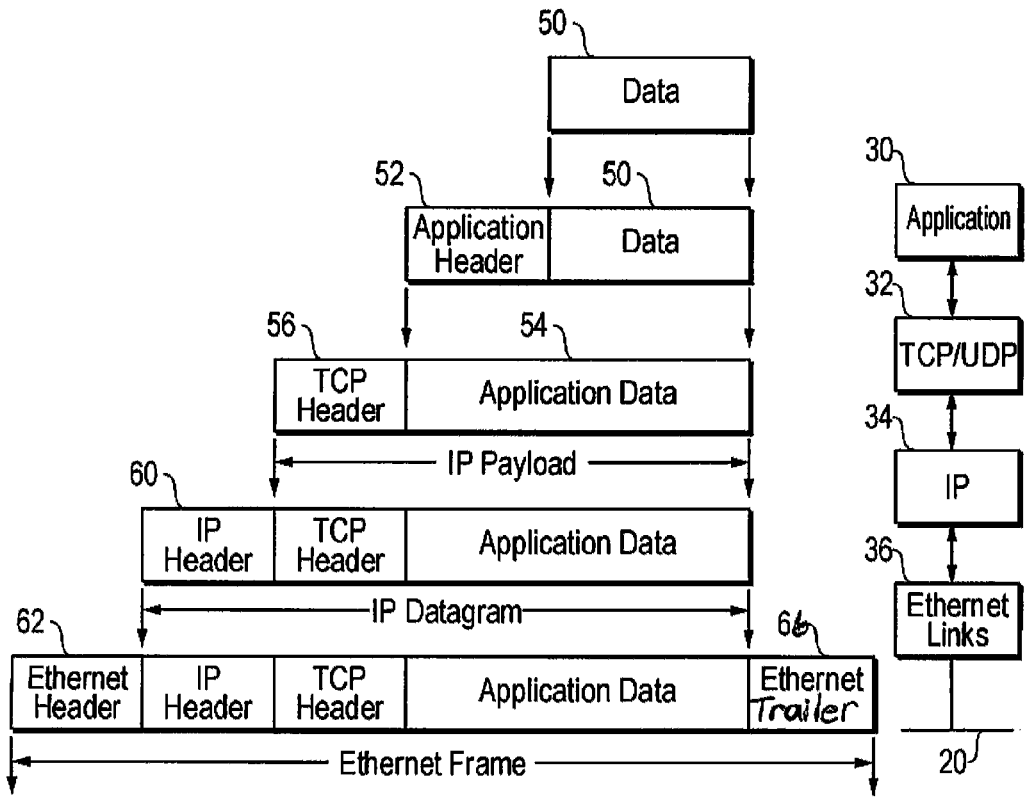
FIG. 3 illustrates aspects of data communication between layers of one of the nodes shown in FIG. 2.
Figure 4:
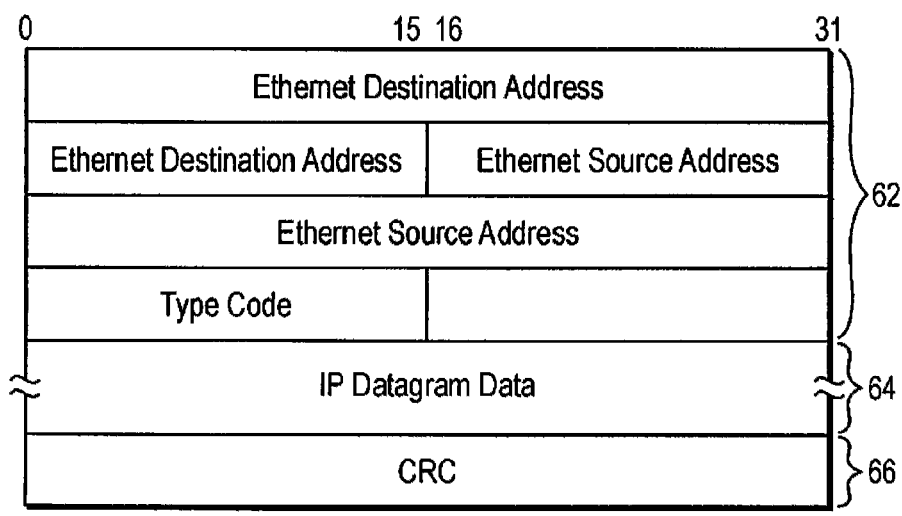
FIG. 4 is a block diagram representation of a typical Ethernet frame.
Figure 5:
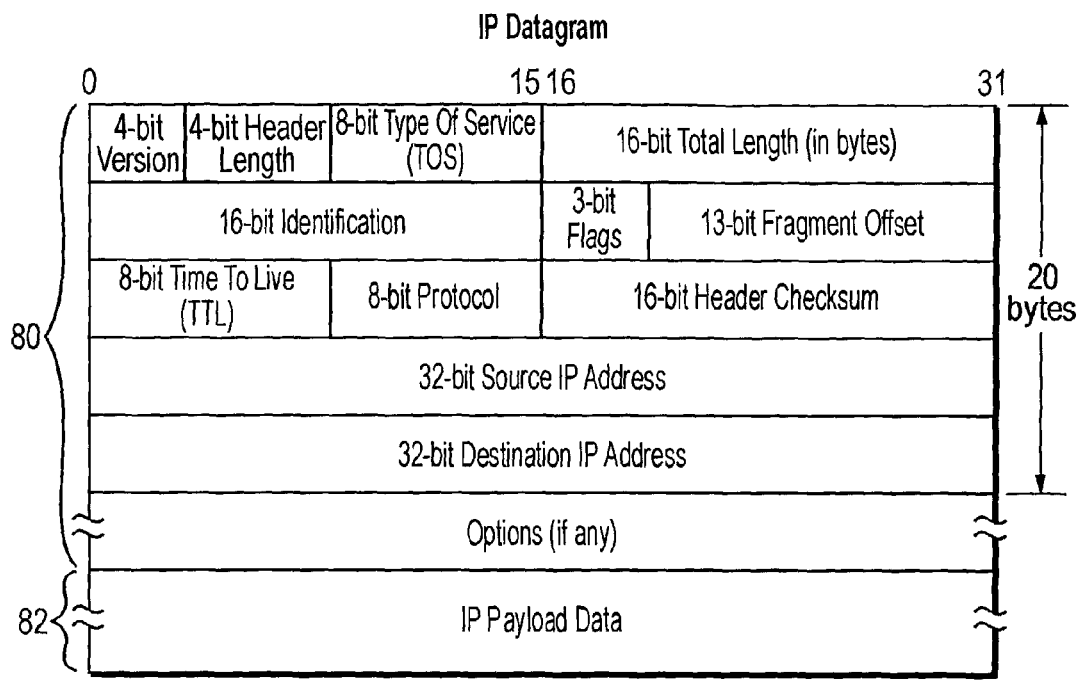
FIG. 5 is a block diagram representation of a typical IP datagram.
Figure 6:
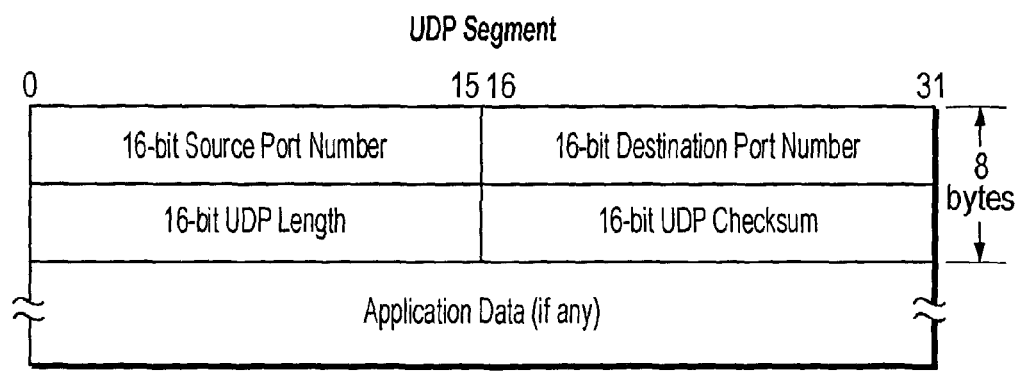
FIG. 6 is a block diagram representation of a typical UDP segment.
Figure 7:
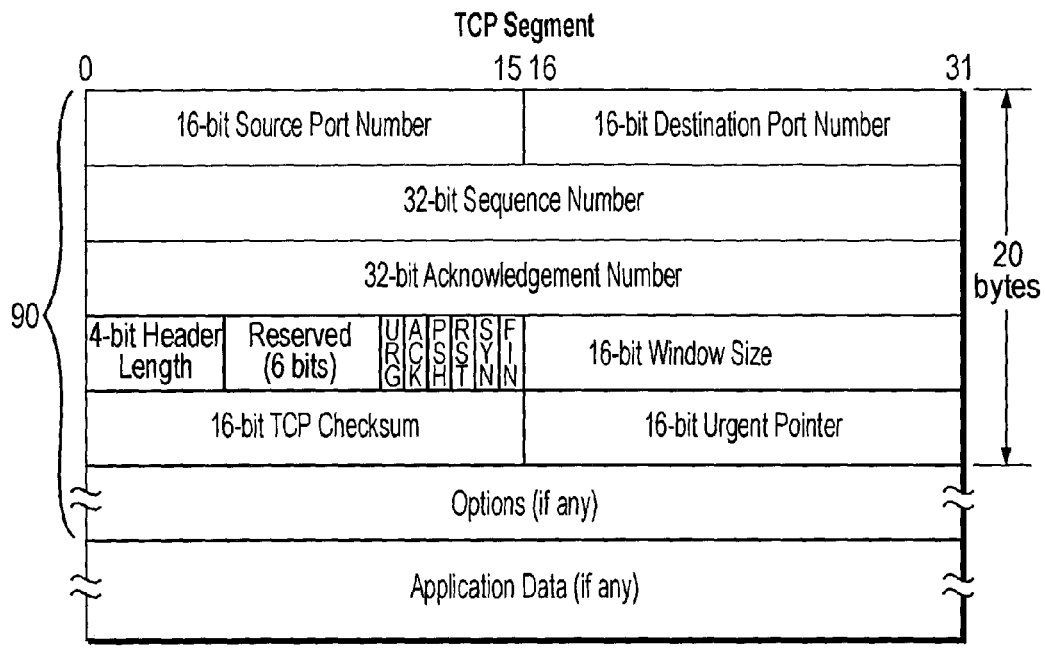
FIG. 7 a block diagram representation of a typical TCP segment.
Figure 8:
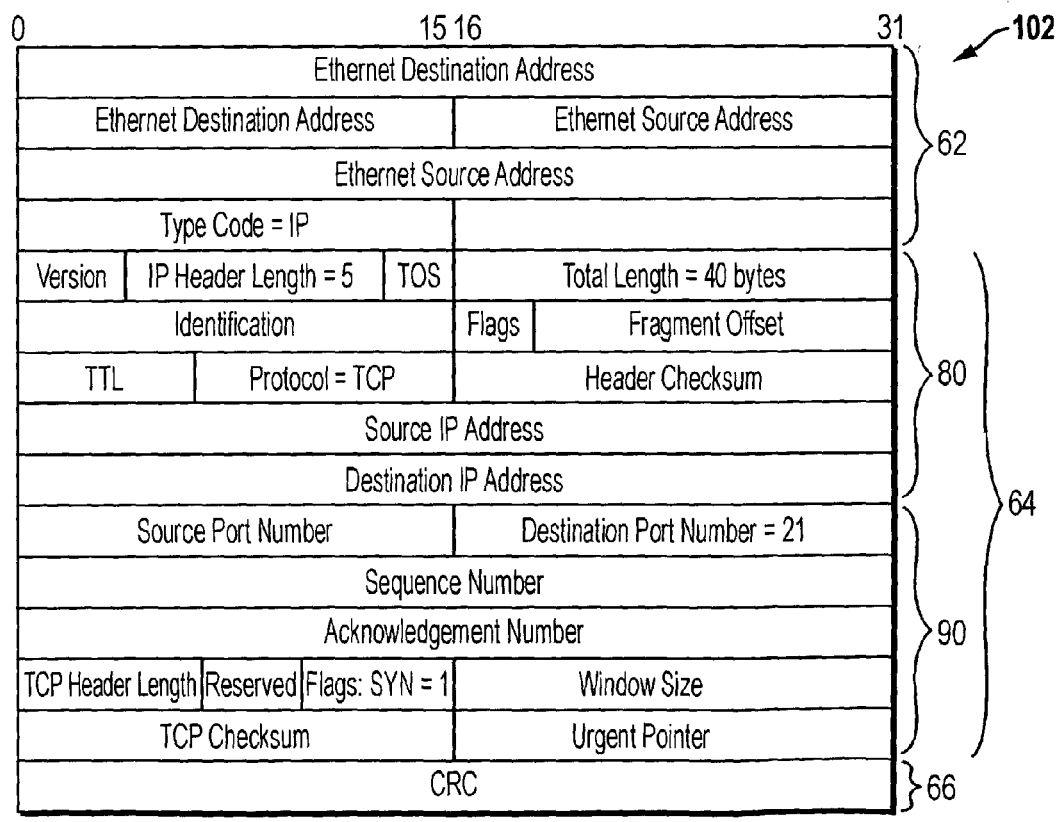
FIG. 8 is a block representation of an exemplary Ethernet frame.
Figure 9:
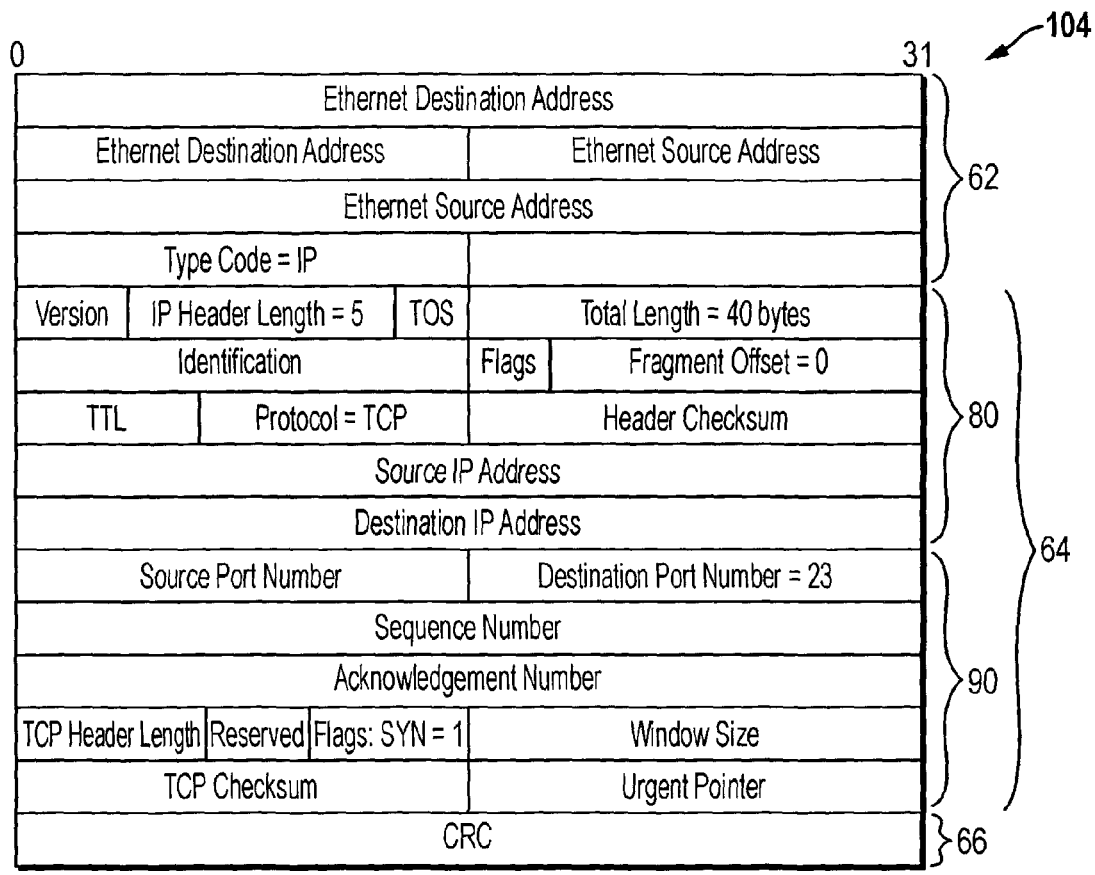
FIG. 9 is a block representation of an exemplary Ethernet frame.
Figure 10:
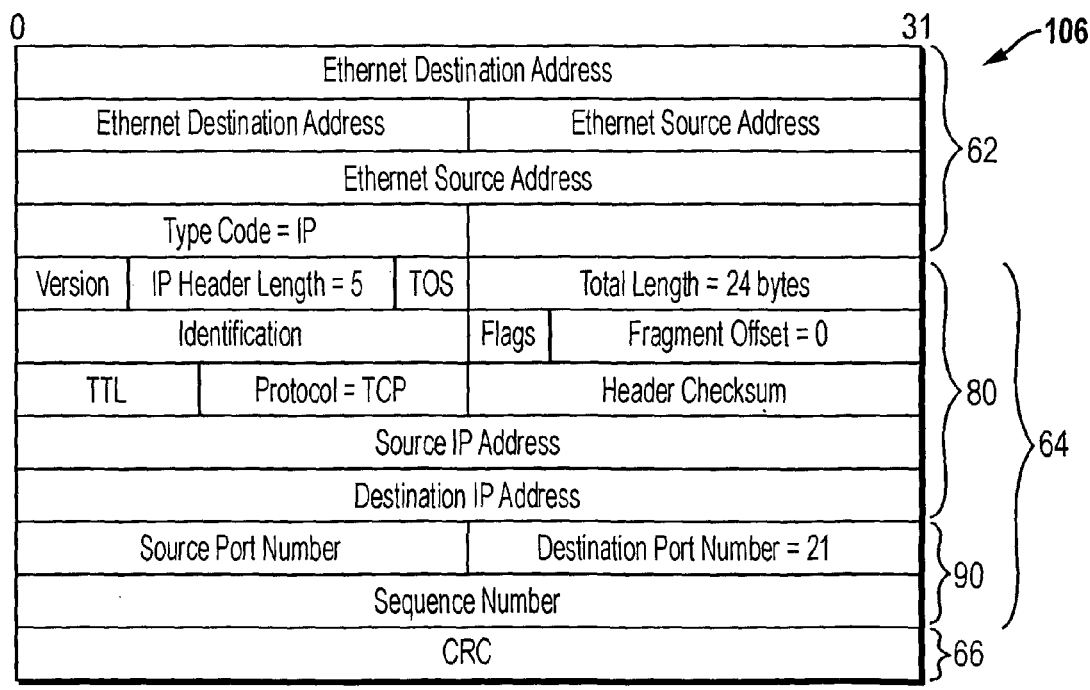
FIG. 10 is a block representation of an exemplary Ethernet frame.
Figure 11:
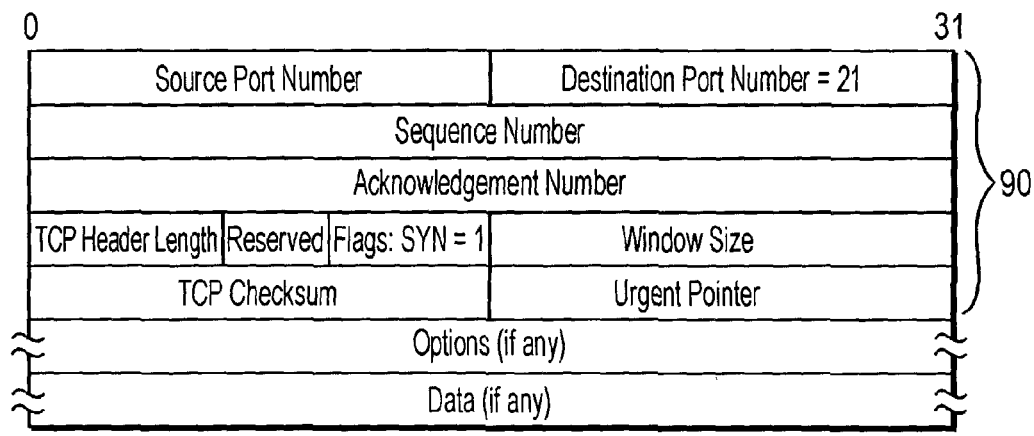
FIG. 11 is a block representation of an exemplary IP datagram.
Figure 12:
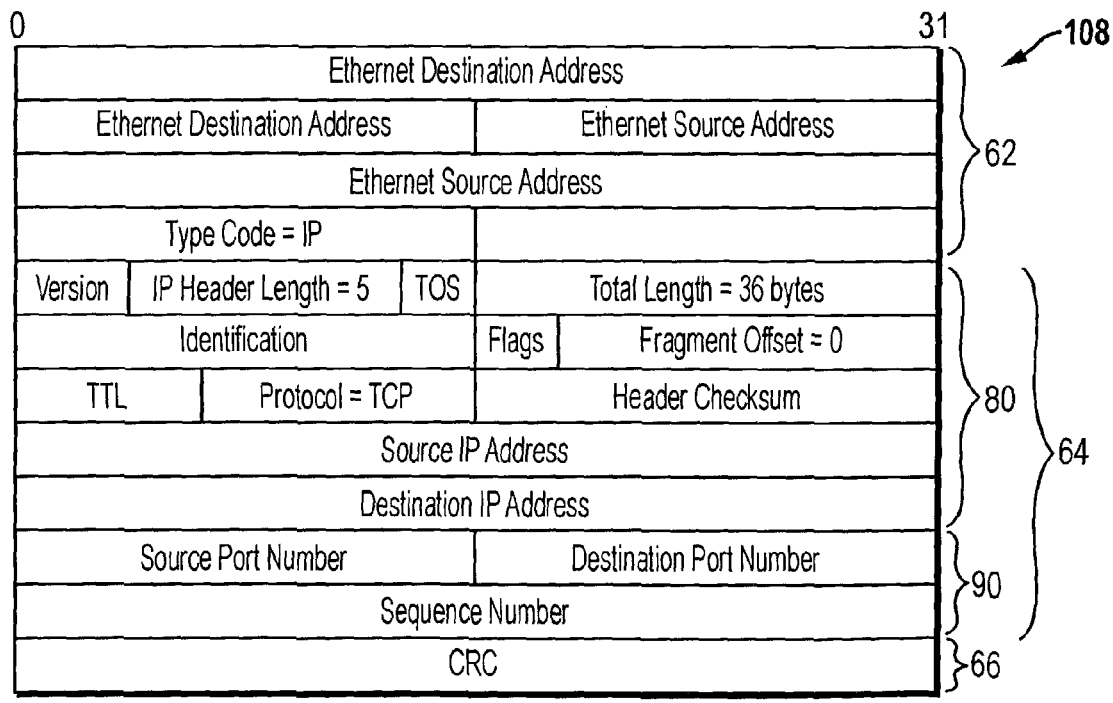
FIG. 12 is a block representation of an exemplary IP datagram.

As described in the background section above Frame 108 in FIG. 12 is capable of passing the RFC 3128 algorithm. If router 116 receives frame 108, filter 142 executing the algorithm set forth above, will drop frame 108 if, for example, P0 is set to 2 such that P0×8 is 16 bytes. When router 116 receives frame 108, Lengths 1 and 2 are calculated. For purposes of explanation the total number of bytes of frame 108 including the bytes in the Ethernet header and trailer, is counted. In the illustrated example, because each line of frame 108 is 32-bits long, a total number of 46 bytes will be counted. The total number of bytes in the Ethernet header and trailer is 18. The IP header length value in the IP header of frame 108 is 5. Accordingly, Length 2 (in bytes)=46−18−(5×4)=8. Because 8 bytes is less than P0×8=16 bytes, frame 108 shown in FIG. 12 will be dropped by filter 142 in accordance with check (2).

Figure 14:
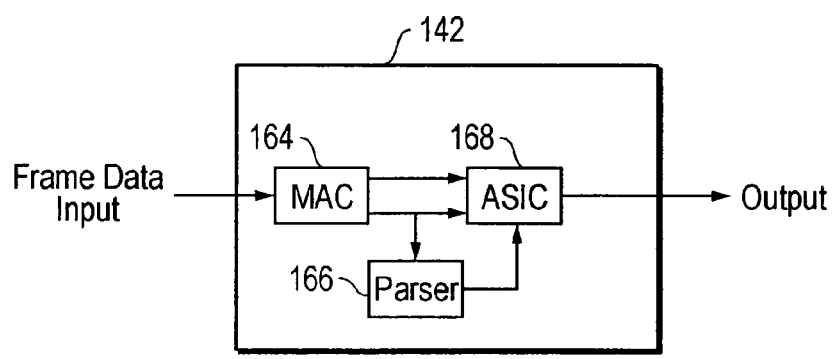
FIG. 14 is a block diagram illustrating relevant components of one embodiment of a filter employed in the router or switch of FIG. 13.

As noted above, the checks (1)-(10) above can be performed by one or more processors within router 116 executing software instructions. Alternatively, the checks (1)-(10) above can be performed by one or more ASICs within router 116. FIG. 14 illustrates one non-software implemented filter embodiment for checking frames in accordance with checks (1)-(10). More particularly, FIG. 14 shows in block diagram form, a media access control (MAC) circuit 164 coupled to a parser circuit 166 and ASIC 168. In operation, MAC circuit 164 receives an Ethernet frame directly or indirectly from node 112 via Ethernet communication link 120. Media access controller may store the received frame within a memory (not shown). MAC circuit 164 counts the total number of bytes within the received frame, including the number of bytes of the Ethernet frame header and trailer. This value is provided as the total number of counted bytes to ASIC 168. Additionally, MAC circuit 164 provides the frame data to ASIC 168 and parser 146. It is noted that MAC circuit 164 processes the received frame into a format that can be understood by ASIC 168 and parser 166. ASIC 168 in response to receiving the frame data and the total number of counter bytes from MAC circuit 164, performs one or more of the checks (1)-(10) above. If the frame received by ASIC 168 does not meet one or more of the checks set forth above, then the frame is dropped.

Although the present invention has been described in connection with several embodiments, the invention is not intended to be limited to the embodiments described herein. On the contrary, it is intended to cover such alternatives, modifications, and equivalents as can be reasonably included within the scope of the invention as defined by the appended claims.

What is claimed is:

1. A method comprising:
receiving a link layer protocol frame wherein the frame is an Ethernet frame, wherein the Ethernet frame comprises an Ethernet Header and an Internet Protocol (IP) datagram, wherein the IP datagram comprises an IP payload;
counting all data bytes of the Ethernet frame to generate a total number of counted bytes;
calculating a data length of the IP payload, wherein the IP payload data length is calculated as a function of the total number of counted bytes;
storing the calculated IP payload data length in memory;
comparing the calculated IP payload data length to a predetermined value.

2. The method of claim 1 further comprising passing a portion or all of the Ethernet frame through a router firewall if the calculated IP payload data length is equal to or greater than the predetermined value.

3. The method of claim 1 wherein a portion or all of the Ethernet frame is passed directly or indirectly to an operating system executing on a computer system if the calculated IP payload data length is equal to or greater than the predetermined value.

4. The method of claim 1 wherein a portion or all of the Ethernet frame is passed to a UDP layer of an operating system executing on a computer system if the calculated IP payload data length is equal to or greater than the predetermined value.

5. The method of claim 1 wherein:
wherein the IP datagram comprises an IP header;
wherein the IP header comprises an IP header data length value;
wherein the IP payload data length is calculated as a function of the IP header data length value.

6. The method of claim 5 wherein:
wherein the IP payload data length is calculated as a function of a data length value of the Ethernet header.

7. The method of claim 1 wherein the all data bytes of the Ethernet frame are received by a circuit and wherein the all data bytes are counted as the all data bytes are received by the circuit.

8. The method of claim 1 wherein the IP header comprises an IP header data length value and an IP datagram data length value, wherein the method further comprises;
calculating a second data length of the IP payload as a function of the IP header length value and the IP datagram length value;
comparing the calculated second data length to the predetermined value;
passing a portion or all of the Ethernet frame if the calculated second data length is equal to or greater than the predetermined value.

9. The method of claim 1 further comprising dropping the Ethernet frame if the calculated IP payload data length is less than the predetermined value.

10. The method of claim 1 further comprising:
comparing a fragment offset value of the Ethernet frame with a second predetermined value.

11. The method of claim 10, wherein the second predetermined value is zero.

12. The method of claim 1 wherein
the counting comprises setting a variable in memory to zero and incrementing the variable for each data byte of the received Ethernet frame, and
the variable defines the total number of counted bytes after the variable has been incremented for each data byte of the received Ethernet frame.

13. An apparatus comprising:
a circuit comprising a first circuit for receiving a frame;
wherein the first circuit counts all data bytes of the frame to generate a total number of counted bytes;
wherein the first circuit is configured to calculate a data length in bytes of an IP payload of the frame, wherein the IP payload data length is calculated by the first circuit as a function of the total number of counted bytes;
wherein the first circuit is configured to store the calculated IP payload data length in memory;
wherein the first circuit is configured to compare the calculated IP payload data length to a predetermined value.

14. The apparatus of claim 13:
wherein the first circuit generates a signal if the calculated IP payload data length is equal to or greater than the predetermined value, and:
wherein the circuit passes a portion or the entire frame if the first circuit generates the signal.

15. The apparatus of claim 14 further comprising:
a computer system coupled to the circuit;
wherein the circuit passes the portion or the entire frame to the computer system if the first circuit generates the signal.

16. The apparatus of claim 15 further comprising:
a computer system coupled to the circuit, wherein the computer system executes an operating system, wherein the operating system comprises a User Datagram Protocol (UDP) layer;
wherein the circuit passes the portion or the entire frame to the UDP layer if the first circuit generates the signal.

17. The apparatus of claim 13:
wherein the frame comprises an IP header;
wherein the IP header comprises an IP header data length value;
wherein the first circuit calculates the IP payload data length as a function of the IP header data length.

18. The apparatus of claim 17:
wherein the frame comprises an Ethernet header, and
wherein the first circuit calculates the IP payload data length as a function of a data length value of the Ethernet header.

19. The apparatus of claim 13:
wherein the first circuit is configured to calculate a second data length of the IP payload;
wherein the frame comprises an IP datagram, wherein the IP datagram comprises an IP header and the IP payload, wherein the IP header comprises an IP header data length value and an IP datagram data length value;
wherein the first circuit is configured to calculate the second data length of the IP payload as a function of the IP header length value and the IP datagram length value.

20. The apparatus of claim 13, wherein the circuit drops the frame if the calculated IP payload data length is less than the predetermined value.

21. The apparatus of claim 13 wherein the first circuit is coupled to a memory that stores a variable;
wherein the first circuit is configured to set the variable to zero;
wherein the first circuit is configured to increment the variable for each data byte of the received frame;

wherein the variable defines the total number of counted bytes after the variable has been incremented for each data byte of the received frame.

22. A non-transitory computer readable storage medium for storing software instructions executable by a data processing circuit, wherein the data processing circuit performs a method in response to executing the instructions, the method comprising:

counting all data bytes of a frame transmitted via a communication link, wherein the data bytes are counted to generate a total number of counted bytes;

calculating a data length of an IP payload of the frame, wherein the data length is calculated as a function of the total number of counted bytes;

storing the calculated IP payload data length in memory;

comparing the calculated IP payload data length to a predetermined value.

23. The non-transitory computer readable storage medium of claim 22 wherein the method further comprises passing a portion or all of the frame to a computer system if the calculated IP payload data length is equal to or greater than the predetermined value.

24. The non-transitory computer readable storage medium of claim 22:

wherein the frame comprises an IP header;

wherein the IP header comprises an IP header data length value;

wherein the IP payload data length is calculated as a function of the IP header data length.

25. The non-transitory computer readable storage medium of claim 22:

wherein the frame comprises an Ethernet header;

wherein the IP payload data length is calculated as a function of a data length value of the Ethernet header.

26. The non-transitory computer readable storage medium of claim 22 wherein the method further comprises:

calculating a second data length of the IP payload as a function of a IP header length and a IP datagram length of the frame;

comparing the calculated second data length to the predetermined value;

passing the portion or all of the frame if the calculated second data length is equal to or greater than the predetermined value.

27. The non-transitory computer readable storage medium of claim 22, wherein the method further comprises dropping the frame if the calculated IP payload data length is less than the predetermined value.

28. The non-transitory computer readable storage medium of claim 22 wherein counting the all data bytes comprises setting a variable in memory to zero and incrementing the variable for each data byte of the received frame, and the variable defines the total number of counted bytes after the variable has been incremented for each data byte of the received frame.

* * * * *